(12) United States Patent
Kojo et al.

(10) Patent No.: US 10,703,360 B2
(45) Date of Patent: Jul. 7, 2020

(54) PARKING SUPPORT METHOD AND DEVICE

(71) Applicant: Nissan Motor Co., Ltd., Yokohama-shi, Kanagawa (JP)

(72) Inventors: Naoki Kojo, Kanagawa (JP); Tomoko Kurotobi, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 210 days.

(21) Appl. No.: 16/061,901

(22) PCT Filed: Aug. 1, 2016

(86) PCT No.: PCT/JP2016/072493
§ 371 (c)(1),
(2) Date: Jun. 13, 2018

(87) PCT Pub. No.: WO2017/104163
PCT Pub. Date: Jun. 22, 2017

(65) Prior Publication Data
US 2018/0354504 A1    Dec. 13, 2018

(30) Foreign Application Priority Data
Dec. 17, 2015 (JP) ................................. 2015-246109

(51) Int. Cl.
*B60W 30/00* (2006.01)
*B60W 40/00* (2006.01)
(Continued)

(52) U.S. Cl.
CPC ............ *B60W 30/06* (2013.01); *B60W 40/02* (2013.01); *B62D 15/027* (2013.01);
(Continued)

(58) Field of Classification Search
CPC ...... B60W 30/00; B60W 30/06; B60W 40/00; B60W 40/02; B62D 15/00; B62D 15/027;
(Continued)

(56) References Cited

U.S. PATENT DOCUMENTS 8,374,749 B2 * 2/2013 Tanaka ...................... B60R 1/00
701/36
9,400,897 B2 * 7/2016 Bruning ............... B62D 15/027
(Continued)

FOREIGN PATENT DOCUMENTS

JP    2006160194 A    6/2006
JP    2010019752 A    1/2010
(Continued)

*Primary Examiner* — Yonel Beaulieu
(74) *Attorney, Agent, or Firm* — Young Basile Hanlon & MacFarlane, P.C.

(57) ABSTRACT

A method is provided which comprises: acquiring, from a set of ranging sensors, recognition information about a plurality of parked vehicles existing in a parking frame group comprising a plurality of parking frames arranged side by side; selecting representative points of the parked vehicles from the recognition information; calculating a distance between representative points that is a distance between the representative points adjacent to each other; and calculating a width of the parking frames on the basis of the distance between representative points.

9 Claims, 9 Drawing Sheets

(51) Int. Cl.
*G08G 1/16* (2006.01)
*B62D 15/00* (2006.01)
*B60W 30/06* (2006.01)
*B60W 40/02* (2006.01)
*G06T 7/60* (2017.01)
*B62D 15/02* (2006.01)
*G06K 9/46* (2006.01)
*G06K 9/00* (2006.01)
*B60R 21/00* (2006.01)
*G01S 15/931* (2020.01)

(52) U.S. Cl.
CPC ..... *G06K 9/00201* (2013.01); *G06K 9/00812* (2013.01); *G06K 9/4604* (2013.01); *G06K 9/4642* (2013.01); *G06T 7/60* (2013.01); *B60R 21/00* (2013.01); *G01S 2015/936* (2013.01); *G08G 1/16* (2013.01)

(58) Field of Classification Search
CPC .. G06K 9/00; G06K 9/00201; G06K 9/00812; G06K 9/4604; G06K 9/4642; G06T 7/60; G06T 2207/30252; G06T 2207/30264; G08G 1/16
See application file for complete search history.

(56) References Cited

U.S. PATENT DOCUMENTS

| | | | | |
|---|---|---|---|---|
| 10,155,540 | B2* | 12/2018 | Kiyokawa | B62D 15/0285 |
| 2009/0121899 | A1* | 5/2009 | Kakinami | B62D 15/027 |
| | | | | 340/932.2 |
| 2011/0293145 | A1* | 12/2011 | Nogami | B60R 1/00 |
| | | | | 382/103 |
| 2017/0028985 | A1* | 2/2017 | Kiyokawa | B62D 15/0285 |
| 2018/0334189 | A1* | 11/2018 | Benmimoun | B62D 15/0285 |
| 2018/0354504 | A1* | 12/2018 | Kojo | B60W 30/06 |

FOREIGN PATENT DOCUMENTS

| | | |
|---|---|---|
| JP | 2013220745 A | 10/2013 |
| JP | 2013220802 A | 10/2013 |
| JP | 2014054912 A | 3/2014 |
| JP | 2014157501 A | 8/2014 |
| JP | 2015-083430 A | 4/2015 |

* cited by examiner

PARKING SUPPORT METHOD AND DEVICE

CROSS-REFERENCE TO RELATED APPLICATIONS

The present application is based on Japanese Patent Application No. 2015-246109 filed on Dec. 17, 2015, the entire content of which is herein incorporated by reference.

TECHNICAL FIELD

The present invention relates to a parking assist method and a parking assist device.

BACKGROUND

A parking assist device equipped in a vehicle is known (see Japanese Patent Application JP2013-220802A, for example). This device operates to recognize a white line on a road surface as a parking frame using the output of a radar device equipped in the vehicle and set a parking target position in a region partitioned by the recognized white line. The parking assist device described in Japanese Patent Application JP2013-220802A further operates to extract a cloud of reflection points determined as the same object using the output of the radar device. When two clouds of reflection points are extracted and a space having a predetermined width or more exists between the two clouds of reflection points, the parking assist device operates to set the target parking position in the space.

The parking assist device described in Japanese Patent Application JP2013-220802A sets one or more parking frames on the basis of a width of parking frames that is preliminarily set, but the actual parking frames have a variety of widths. Setting of the parking frames may therefore be affected by the errors between the set value of the width of parking frames and the actual widths of the parking frames.

SUMMARY

A problem to be solved by the present invention is to provide a parking assist method and a parking assist device with which parking frames can be appropriately set.

The present invention solves the above problem through acquiring recognition information about three or more parked vehicles existing in a parking frame group comprising three or more parking frames arranged side by side, selecting representative points set at the same positions of the three or more parked vehicles from the recognition information, calculating a distance between representative points that is a distance between the representative points adjacent to each other, and calculating a width of the parking frames on the basis of a plurality of the distance between representative points, setting an assumed value as the width of the parking frames and calculating errors between the distances between representative points and a value of an integral multiple of the assumed value, and calculating the assumed value which gives a minimum sum of the errors as the width of the parking frames.

According to the present invention, the width of the parking frames is calculated on the basis of the distance between representative points of the recognized parked vehicles, and the errors between the width of parking frames which is to be set and the actual widths of the parking frames can thereby be reduced. Thus, an effect is obtained that the parking frames can be appropriately set.

DETAILED DESCRIPTION

Figure 1:
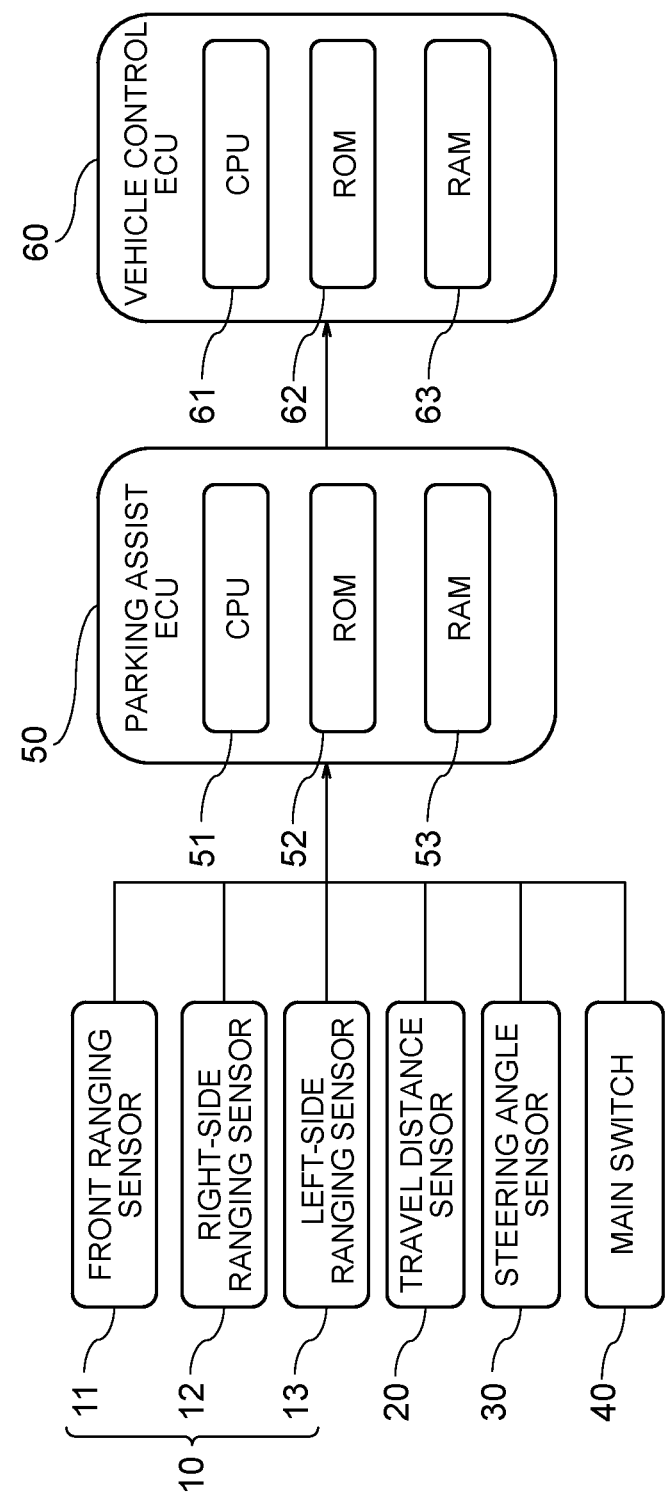
FIG. 1 is a block diagram illustrating the configuration of a parking assist device according to one or more embodiments of the present invention.

FIG. 1 is a block diagram illustrating the configuration of a parking assist device 100 according to one or more embodiments of the present invention. The parking assist device 100, which is equipped in a vehicle, assists an operation of moving (parking) the vehicle into a parking space. The parking assist device 100 includes a set of ranging sensors 10, a travel distance sensor 20, a steering angle sensor 30, a main switch 40, a parking assist electronic control unit (ECU) 50, and a vehicle control ECU 60. The parking assist device 100 further includes hardware modules, such as an engine control ECU and a power assist ECU (not illustrated), which are usually equipped in the vehicle. These components are connected to one another via a controller area network (CAN) or other in-vehicle LAN to mutually exchange information.

As illustrated in the figure, the set of ranging sensors 10 includes, for example, a front ranging sensor 11, a right-side ranging sensor 12, and a left side-ranging sensor 13. The front ranging sensor 11, which is provided at or in the vicinity of the front bumper of the vehicle (subject vehicle), detects the polar coordinates (distances and orientations) of a cloud of reflection points P0 (see FIG. 3) of an object existing ahead of the subject vehicle and outputs them to the parking assist ECU 50. The right-side ranging sensor 12, which is provided at the right side of the subject vehicle (e.g. at the front right part of the subject vehicle), detects the polar coordinates of a cloud of reflection points P0 of an object existing on the right side of the subject vehicle and outputs them to the parking assist ECU 50. The left-side ranging sensor 13, which is provided at the left side of the subject vehicle (e.g. at the front left part of the subject vehicle), detects the polar coordinates of a cloud of reflection points P0 of an object existing on the left side of the subject vehicle and outputs them to the parking assist ECU 50.

Examples of the ranging sensors 10 include laser scanners, radars, and stereo cameras. Any sensor can be employed as each ranging sensor, provided that it can detect the polar coordinates of a cloud of reflection points P0 of an object. The detection area of the set of ranging sensors 10 is set so as to be able to detect the polar coordinates of clouds of reflection points P0 of a plurality of objects that exist on the right and left of the route for the subject vehicle.

The travel distance sensor 20 calculates the movement amount of the subject vehicle and outputs it to the parking assist ECU 50. The travel distance sensor 20 can be configured using an appropriate sensor, such as a rotation speed sensor that detects the rotation speed of one or more wheels of the subject vehicle.

The steering angle sensor 30, which is equipped inside the steering column, for example, detects the rotation angle of the steering wheel and outputs it to the parking assist ECU 50.

The main switch 40, which is a switch for a user to operate to input the start of parking assist, outputs an OFF signal to the parking assist ECU 50 when not operated and outputs an ON signal to the parking assist ECU 50 when operated. The main switch 40 is disposed on an appropriate position at which the driver can operate it, such as a position around the instrument panel and steering wheel of the subject vehicle. Examples of the main switch 40 also include a software switch presented on the screen of a navigation devise and a software switch presented on the screen of a portable terminal, such as a smartphone, which can communicate with the vehicle via a network.

The parking assist ECU 50 is a controller that integrally controls the parking assist device 100. The parking assist ECU 50 comprises a ROM 52 that stores a parking assist program, a CPU 51 as an operation circuit that executes the program stored in the ROM 52 to serve as the parking assist device 100 according to one or more embodiments of the present invention, and a RAM 53 that serves as an accessible storage device. The parking assist ECU 50, to which the detection information is input from the set of ranging sensors 10, the travel distance sensor 20, the steering angle sensor 30, and the main switch 40, executes a parking assist process to be described later, then calculates a target vehicle speed and target steering angle of the subject vehicle, and outputs them to the vehicle control ECU 60.

The vehicle control ECU 60 is a controller that performs drive control of the vehicle. The vehicle control ECU 60 comprises a ROM 62 that stores a vehicle drive control program, a CPU 61 as an operation circuit that serves as a vehicle control device, and a RAM 63 that serves as an accessible storage device. The vehicle control ECU 60, to which the target vehicle speed and target steering angle of the vehicle are input from the parking assist ECU 50, performs the drive control of the vehicle in cooperation with the engine control ECU, the power assist ECU of the steering, etc.

Figure 2:
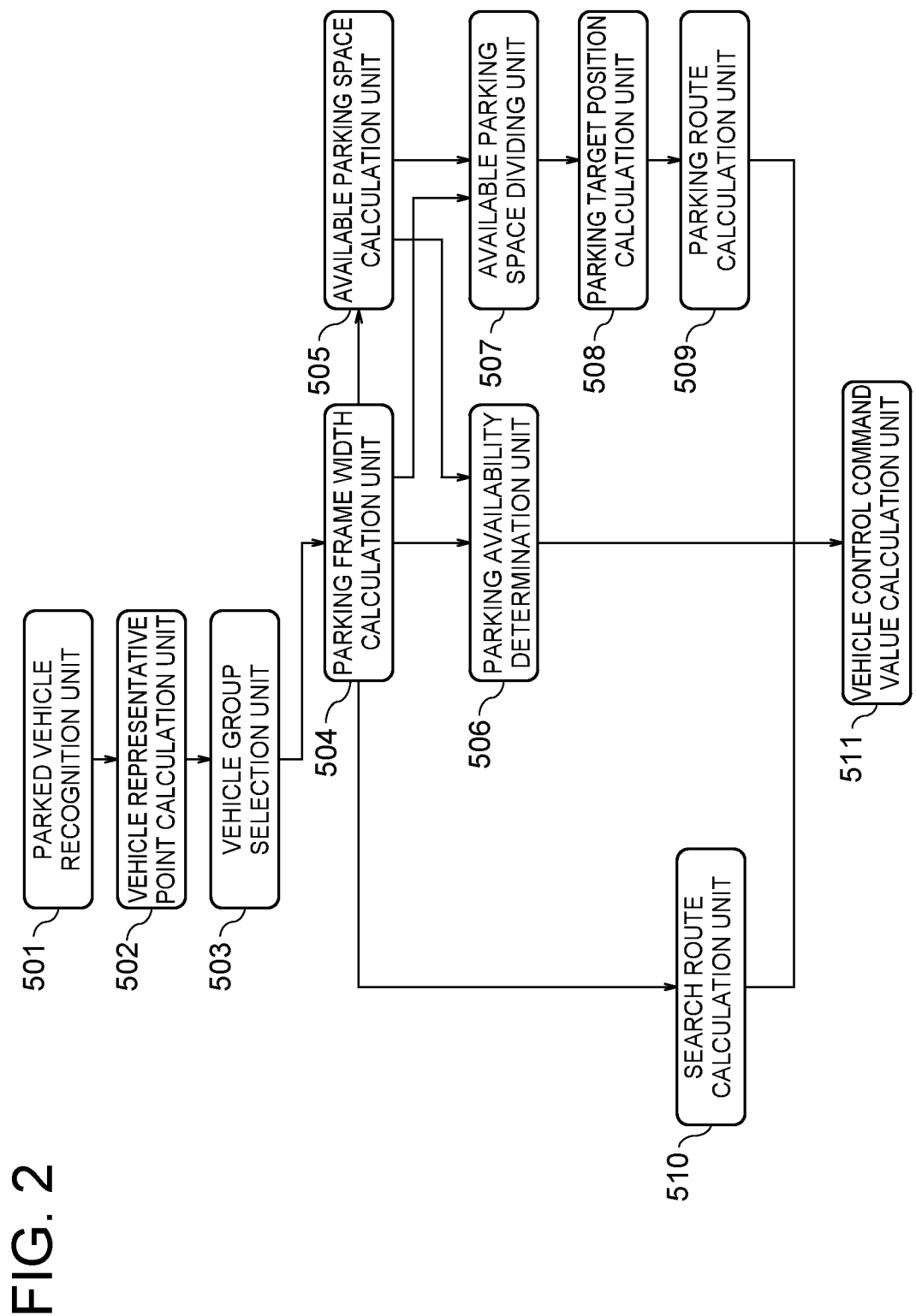
FIG. 2 is a block diagram for describing functions of a parking assist ECU.

FIG. 2 is a block diagram for describing the functions of the parking assist ECU 50. As illustrated in the figure, the parking assist ECU 50 comprises a parked vehicle recognition unit 501, a vehicle representative point calculation unit 502, a vehicle group selection unit 503, a parking frame width calculation unit 504, an available parking space calculation unit 505, a parking availability determination unit 506, an available parking space dividing unit 507, a parking target position calculation unit 508, a parking route calculation unit 509, a search route calculation unit 510, and a vehicle control command value calculation unit 511.

The parked vehicle recognition unit 501 recognizes parked vehicles on the basis of reflection point positional information groups (referred to as "point clouds," hereinafter) that are input as clouds of polar coordinates from the set of ranging sensors 10. The parked vehicle recognition unit 501 first performs coordinate conversion on the point clouds, which are input from the front ranging sensor 11, the right-side ranging sensor 12, and the left side-ranging sensor 13, from the polar coordinates to the xy-plane coordinates for integration and then performs clustering to extract point clouds of close points.

Figure 3:
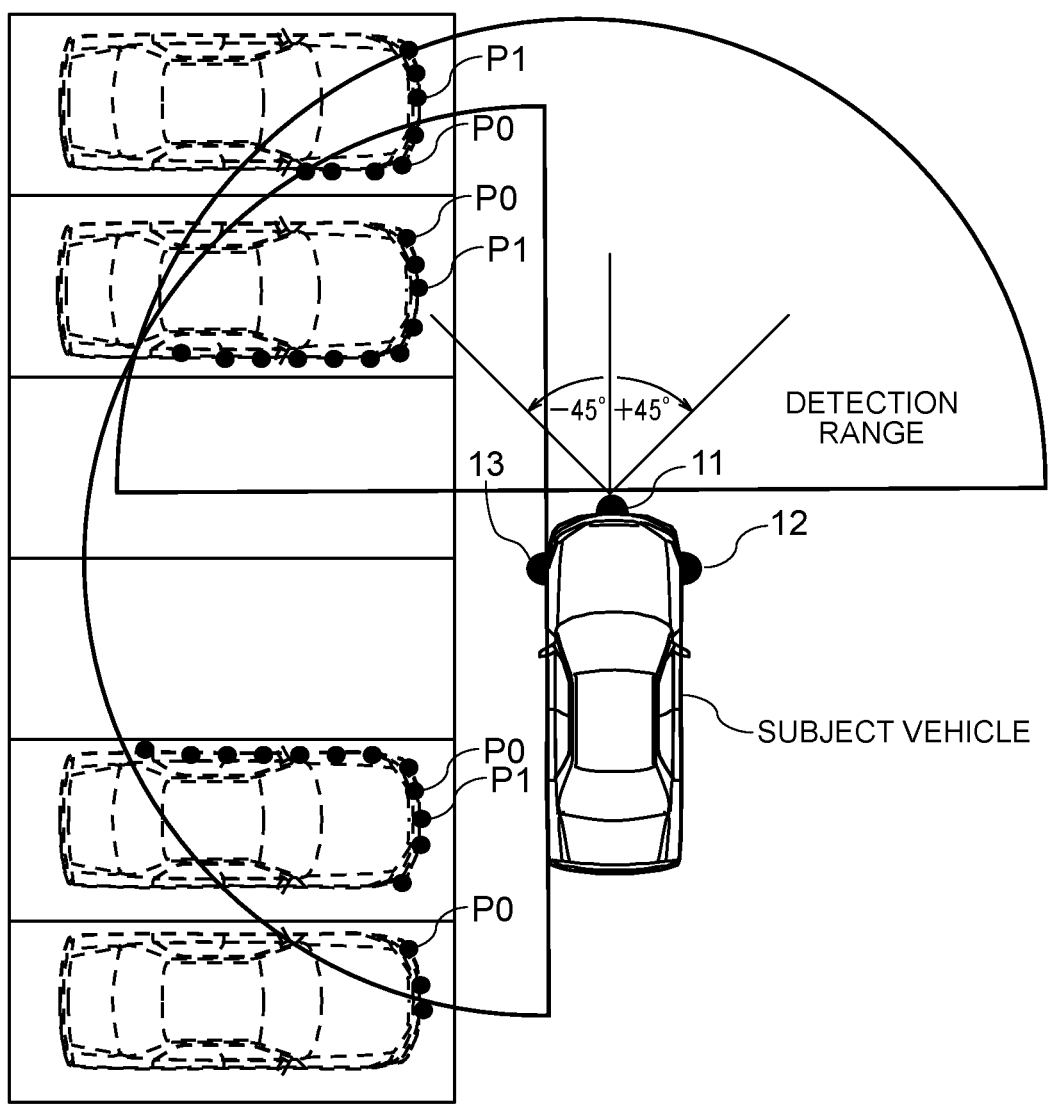
FIG. 3 is a plan view illustrating a state in which a recognition process for parked vehicles is executed in a parking lot of a right-angle parking scheme (also cold parallel parking scheme)

FIG. 3 is a plan view illustrating a state in which the recognition process for parked vehicles is executed in a parking lot of a right-angle parking scheme (also called parallel parking scheme). As illustrated in the figure, when parked vehicles exist in the parking lot of the right-angle parking scheme, the parked vehicles are each extracted as an L-shaped point cloud by the parked vehicle recognition unit 501. Referring again to FIG. 2, when point clouds extracted by performing the clustering are each in an L-shape (a figure of L), the parked vehicle recognition unit 501 outputs the information on the extracted point clouds to the vehicle representative point calculation unit 502. The method of recognizing the parked vehicles is not limited to the above-described method, and other known methods can also be used.

The vehicle representative point calculation unit 502 calculates a representative point P1 of each parked vehicle on the basis of the information on the point cloud input from the parked vehicle recognition unit 501. The vehicle representative point calculation unit 502 first extracts a straight line representing the front face of a parked vehicle parked in the backward direction or the rear face of a parked vehicle parked in the forward direction, and then calculates the center point of the extracted straight line as a representative point P1 of the parked vehicle.

Here, one of a pair of the L-shaped straight lines is a straight line representing the front face of a parked vehicle parked in the backward direction or the rear surface of a parked vehicle parked in the forward direction, and the other straight line is a straight line representing a side surface of the parked vehicle. As illustrated in FIG. 3, in a situation in which the vector indicating the direction of the subject vehicle and the vector indicating the direction of a parked vehicle are at a right angle, the front face of a parked vehicle parked in the backward direction or the rear surface of a parked vehicle parked in the forward direction falls within a range from 45° on the left side to 45° on the right side with respect to the vector indicating the direction of the subject vehicle. The vehicle representative point calculation unit 502 therefore extracts a straight line that falls within a range from 45° on the left side to 45° on the right side with respect to the vector indicating the direction of the subject vehicle as a straight line representing the front face of a parked vehicle parked in the backward direction or the rear surface of a parked vehicle parked in the forward direction. Then, the vehicle representative point calculation unit 502 calculates the center point of the extracted straight line as the representative point P1 of the parked vehicle, and outputs it to the vehicle group selection unit 503.

The vehicle representative point calculation unit 502 calculates not only the position of the representative point P1 of the parked vehicle but also the direction of the parked vehicle on the basis of the direction of the straight line representing the front face or rear face of the parked vehicle and the direction of the straight line representing the side surface of the parked vehicle and outputs the information on the position of the representative point P1 of the parked vehicle and the direction of the parked vehicle to the vehicle group selection unit 503. It is not essential to set the representative point P1 of the parked vehicle at the center of the front face or rear face of the parked vehicle, and it suffices that the representative point P1 is set at the same position for a plurality of parked vehicles. For example, the representative point P1 may be set at the right or left end of the front of the parked vehicle or may also be set at the center (center of gravity) of the parked vehicle or the like.

On the basis of the information on the position of the representative point P1 and direction of each parked vehicle input from the vehicle representative point calculation unit 502, the vehicle group selection unit 503 selects a parked vehicle group existing in a parking frame group composed of a series of parking frames that are arranged in the same direction side by side. Then, the vehicle group selection unit 503 outputs the information on the position of the representative point P1 and direction of each parked vehicle that belongs to the selected parked vehicle group to the parking frame width calculation unit 504, the available parking space calculation unit 505, and the search route calculation unit 510. In this operation, parked vehicles existing in parking frames having different directions are grouped into different parked vehicle groups. When parked vehicle groups exist on the right and left of the subject vehicle which is traveling while searching, the directions of the right and left parked vehicle groups are different by 180°, and the right and left parked vehicles are therefore grouped into different parked vehicle groups.

The method of grouping the parked vehicles is not limited to this. For example, the parked vehicles may be further finely grouped in accordance with whether or not the spacing between parked vehicles is within a predetermined distance (e.g. a distance that allows three vehicles to be parked between the parked vehicles), and when an object that is not a vehicle is recognized between parked vehicles, the parked vehicles may be grouped into separate parked vehicle groups with reference to the object as the border.

In addition or alternatively, the vehicle group selection unit 503 may sequentially execute the process of grouping the parked vehicles each time the information on the representative point P1 of each parked vehicle is input from the vehicle representative point calculation unit 502, but the present invention is not limited to this. For example, the process of grouping the parked vehicles may be executed while the information on the parked vehicles is continuously input (i.e., tracking is performed) so that the information is combined over time. Specifically, the movement amount (so-called odometry) of the subject vehicle is calculated on the basis of the detection information which is input from the travel distance sensor 20 and the steering angle sensor 30, and the previous information on the representative point P1 of the parked vehicle and the current information on the representative point P1 of the parked vehicle are integrated on the basis of the calculation result. In this operation, the information on the representative point P1 of the parked vehicle which was input until the previous time but is not input this time is also used. This allows the calculation process for the width of parking frames, which will be described later, to be executed using the information on many parked vehicles that fall outside the detection range of the set of ranging sensors 10, thus enhancing the stability of results of the calculation process for the width of the parking frames.

The parking frame width calculation unit 504 calculates the width of parking frames on the basis of the information on the positions and directions of the parked vehicles which are grouped into the same parked vehicle group, and outputs the width to the parking availability determination unit 506 and the available parking space dividing unit 507. The information on the positions and directions of the parked vehicles is input from the vehicle group selection unit 503.

Figure 4:
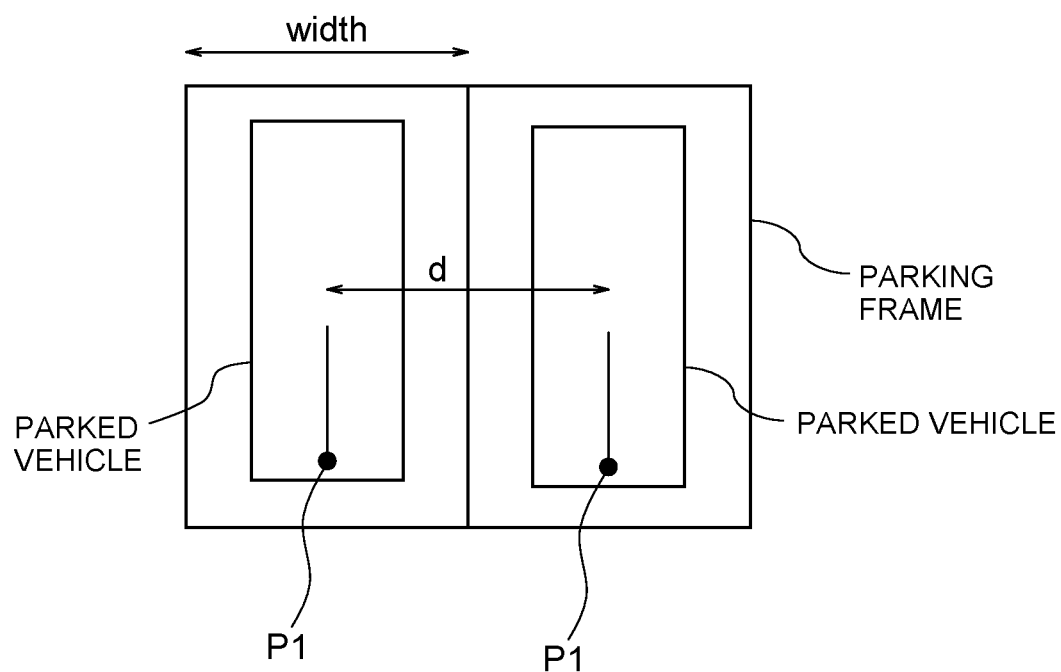
FIG. 4 is a diagram for describing the relationship between a width of parking frames and a unit distance between representative points.

FIG. 4 is a diagram for describing the relationship between a width of parking frames and a unit distance d between representative points. As illustrated in the figure, the width of parking frames is approximately identical with the distance d between the representative points P1 of two parked vehicles existing in the adjacent parking frames (this distance d is referred to as a "unit distance d between representative points," here and hereinafter).

Figure 5:
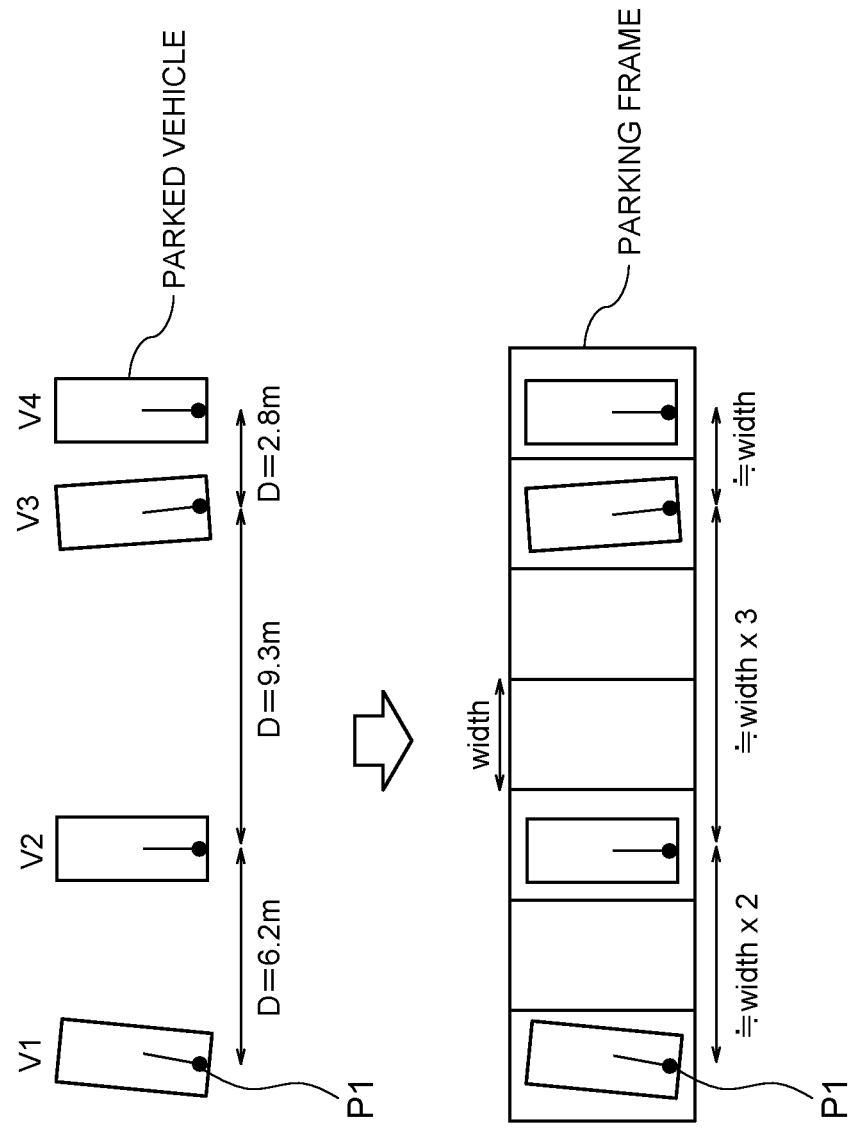
FIG. 5 is a diagram for describing the relationship between a width of parking frames and a distance between representative points when one or more empty parking frames exist between vehicles parked side by side.

FIG. 5 is a diagram for describing the relationship between a width of parking frames and a distance D between representative points when one or more empty parking frames exist between vehicles parked side by side. As illustrated in the figure, the distance D between representative points is approximately an integral multiple of the unit distance d between representative points (the width of parking frames). That is, the distance D between representative points of two parked vehicles existing in the parking frames adjacent to each other is equal to the unit distance d between representative points, the distance D between representative points of two parked vehicles existing in the parking frames adjacent to each other but with one parking frame therebetween is twice the unit distance d between representative points, and the distance D between representative points of two parked vehicles existing in the parking frames adjacent to each other but with two parking frames therebetween is three times the unit distance d between representative points.

The parking frame width calculation unit 504 therefore calculates the width of parking frames using the unit distance d between representative points. Specifically, an assumed value dx is first set as the unit distance d between representative points. The assumed value dx is a value that corresponds to an actual width of parking frames (e.g. 2.2 m to 3.3 m).

Subsequently, for all the calculated distances D between representative points, an error de between each distance D between representative points and the assumed value dx is calculated. Calculation of the error de includes dividing the distance D between representative points by the assumed value dx to calculate a remainder dr. When the remainder dr is larger than dx×½, the error de is calculated using the following equation (1). When the remainder dr is not larger than dx×½, the error de is calculated using the following equation (2).

$$de = dx - dr \qquad (1)$$

$$de = dr \qquad (2)$$

Subsequently, a sum de_sum of the errors de calculated for the distances D between representative points is calculated. Then, the assumed value dx which gives the minimum sum de_sum of the errors is determined as the value of the unit distance d between representative points.

Some situations will now be discussed in which, as illustrated in FIG. 5, the vehicle group selection unit 503 selects four parked vehicles V1 to V4 as the parked vehicle group, the distance D12 between representative points of the parked vehicle V1 and the parked vehicle V2 is 6.2 m, the distance D23 between representative points of the parked vehicle V2 and the parked vehicle V3 is 9.3 m, and the distance D34 between representative points of the parked vehicle V3 and the parked vehicle V4 is 2.8 m.

A first case will be discussed in which the assumed value dx of the unit distance d between representative points is 3.0 m. In this case, the remainder dr for the distance D12 between representative points is 0.2 m, the remainder dr for the distance D23 between representative points is 0.3 m, and the remainder dr for the distance D34 between representative points is 2.8 m. Here, the remainder dr is not larger than dx×½ for the distances D12 and D23 between representative points; therefore, the error de of the distance D12 between representative points is 0.2 m and the error de of the distance D23 between representative points is 0.3 m. On the other hand, the remainder dr is larger than dx×½ for the distance D34 between representative points; therefore, the error de of the distance D34 between representative points is 0.2 m (3.0−2.8=0.2). Thus, the sum de_sum of the errors is 0.7 m.

A second case will be discussed in which the assumed value dx of the unit distance d between representative points is 3.1 m. In this case, the remainder dr for the distance D12 between representative points is 0.0 m, the remainder dr for the distance D23 between representative points is 0.0 m, and the remainder dr for the distance D34 between representative points is 2.8 m. Here, the remainder dr is not larger than dx×½ for the distances D12 and D23 between representative points; therefore, the error de of the distance D12 between representative points is 0.0 m and the error de of the distance D23 between representative points is 0.0 m. On the other hand, the remainder dr is larger than dx×½ for the distance D34 between representative points; therefore, the error de of the distance D34 between representative points is 0.3 m (3.1−2.8=0.3). Thus, the sum de_sum of the errors is 0.3 m.

A third case will be discussed in which the assumed value dx of the unit distance d between representative points is 3.2 m. In this case, the remainder dr for the distance D12 between representative points is 3.0 m, the remainder dr for the distance D23 between representative points is 2.9 m, and the remainder dr for the distance D34 between representative points is 2.8 m. Here, all the remainders dr are larger than dx×½; therefore, the error de of the distance D12 between representative points is 0.2 m (3.2−3.0=0.2), the error de of the distance D23 between representative points is 0.3 m (3.2−2.9=0.3), and the error de of the distance D34 between representative points is 0.4 m (3.2−2.8=0.4). Thus, the sum de_sum of the errors is 0.9 m.

Description will be omitted for the cases of the assumed value dx being 2.2 to 2.9 m and 3.3 m, but it has been confirmed that there are no cases in which the sum de_sum of the errors is less than 0.3 m. From the above, the sum de_sum of the errors is minimized when the assumed value dx of the unit distance d between representative points is 3.1 m, so the optimum value of the unit distance d between representative points is 3.1 m.

The method of using the distances D between representative points to calculate the width of parking frames has been described, but the present invention is not limited to this. For example, a straight line connecting a plurality of representative points P1 (referred to as a "front line," hereinafter) may be fitted using an appropriate scheme such as random sample consensus (RANSC), and the distance between the representative points P1 on the front line may be used.

Figure 6:
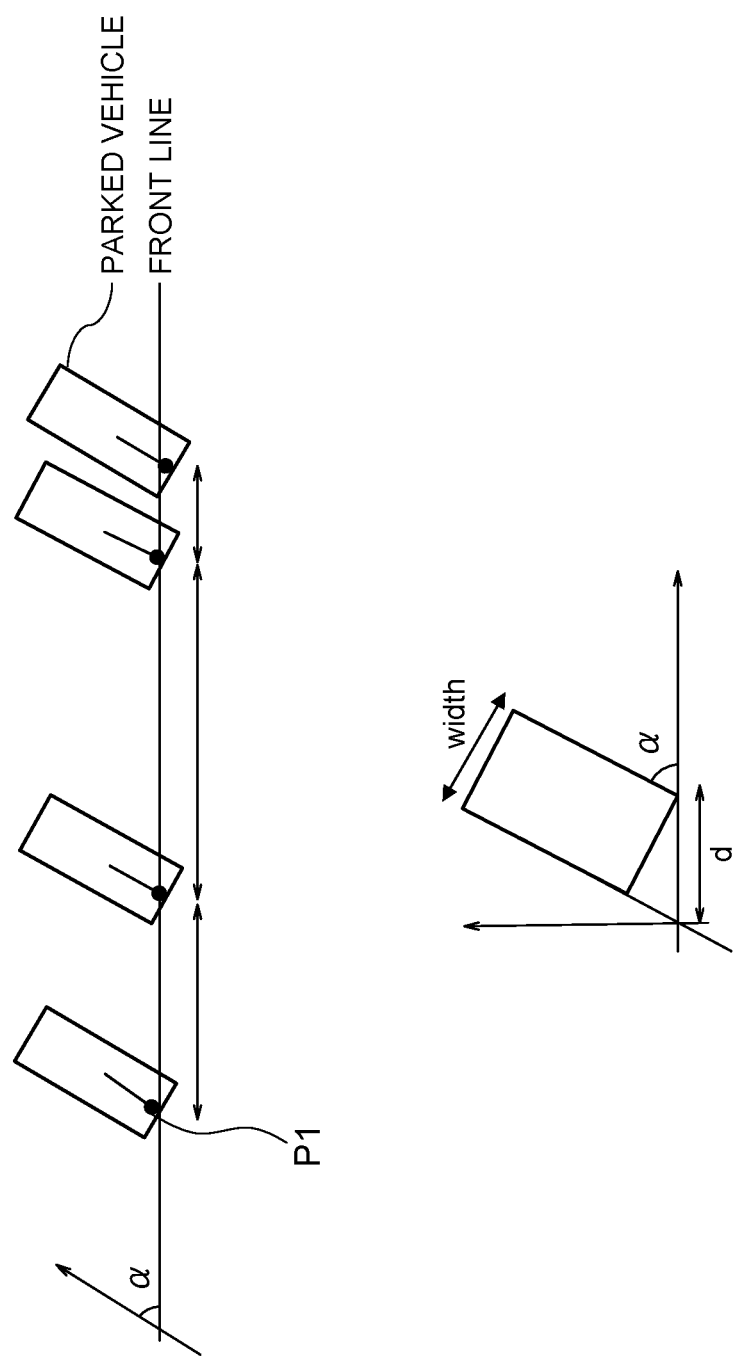
FIG. 6 is a diagram illustrating the relationship between a width of parking frames and an inclined angle of the parking frames with respect to a front line in the case of an angle parking scheme.

Subsequently, the width of the parking frames is calculated. As illustrated in FIG. 5, in the case of the right-angle parking scheme which is not the angle parking scheme, the width direction of the parking frames and the arrangement direction of the parking frames are the same, and the width of the parking frames is therefore calculated as the unit distance d between representative points. On the other hand, in the case of the angle parking scheme as illustrated in FIG. 6, the width direction of the parking frames is inclined at a predetermined angle α with respect to the arrangement direction of the parking frames (the extending direction of the front line), and the width of the parking frames is therefore calculated as d×sin α.

In the case of the right-angle parking scheme, the angle α is 90° and the width of the parking frames is d×sin 90°=d, so the width of the parking frames can be calculated as d×sin α as in the case of the angle parking scheme (width=d×sin α). However, detection of the directions of parked vehicles involves errors, and it is therefore preferred to calculate the width of the parking frames as the unit distance d between representative points (width=d) if the parking scheme can be determined as the right-angle parking scheme rather than the angle parking scheme.

The available parking space calculation unit 505 calculates an empty parking space (i.e. an available parking space) on the basis of the information on the point clouds which is input from the set of ranging sensors 10, and outputs the empty parking space to the parking availability determination unit 506 and the available parking space dividing unit 507. Examples of methods of detecting the empty parking space include a method of calculating a so-called grid map (grid map obtained by dividing the space into grid-like spaces) using the simultaneous localization and mapping (SLAM) technique. The grid map indicates whether each parking space is empty or occupied.

The available parking space calculation unit 505 extracts the empty parking space, for example, on the basis of the information on the front line of the parked vehicle group input from the parking frame width calculation unit 504 and the calculated grid map. In the example illustrated in FIG. 5, a parking space corresponding to one frame on the left side in the figure and a parking space corresponding to two frames on the center in the figure are each calculated as the available parking space.

The parking availability determination unit 506 determines whether or not parking of the subject vehicle into the available parking space is possible, on the basis of the information on the width of the parking frames input from the parking frame width calculation unit 504, the information on the available parking space input from the available parking space calculation unit 505, and the information on the vehicle width v_width of the subject vehicle, and outputs the determination result to the vehicle control command value calculation unit 511.

First, the parking availability determination unit 506 compares the vehicle width v_width of the subject vehicle with the width of the parking frames and makes a determination that parking of the subject vehicle into the available parking space is possible when the condition of the following expression (3) is satisfied.

$$v\_width < width + width\_threshold \quad (3)$$

The width_threshold is a value that is preliminarily set to ensure a space necessary for getting on and off the subject vehicle in the available parking space. Here, when it is unnecessary to take into account the getting on and off of a person, such as in the case of automated driving, the width_threshold may be set small.

Subsequently, the parking availability determination unit 506 calculates a width area_width when the available parking space is projected onto the front line, and makes a determination that parking of the subject vehicle into the available parking space is possible when the condition of the following expression (4) is satisfied. That is, the parking availability determination unit 506 determines whether or not the width of the available parking space is sufficient.

$$v\_width < area\_width + width\_threshold \quad (4)$$

The available parking space dividing unit 507 divides the available parking space by the number Pnum of parking frames on the basis of the information on the width of the parking frames input from the parking frame width calculation unit 504 and the information on the available parking space input from the available parking space calculation unit 505, and outputs the information on the divided available parking spaces to the parking target position calculation unit 508.

First, the available parking space dividing unit 507 calculates the number Pnum of parking frames existing in the available parking space. A method of calculating the number Pnum of parking frames includes calculating the width area_width (=D×sin α) when the available parking space is projected onto the front line. The method further includes dividing the width area_width by the width of the parking frames to calculate a quotient Wq and a remainder Wr. Then, in the case of Wq−Wr<A, the number of parking frames is calculated as Pnum=Wq+1, and in the case of Wq−Wr≥A, the number of parking frames is calculated as Prum=Wq. The value A as used herein is a value that is preliminarily set to treat the remainder Wr as the width of the parking frames when the remainder Wr is less than the width of one parking frame but Wr≈width is satisfied.

Figure 7:
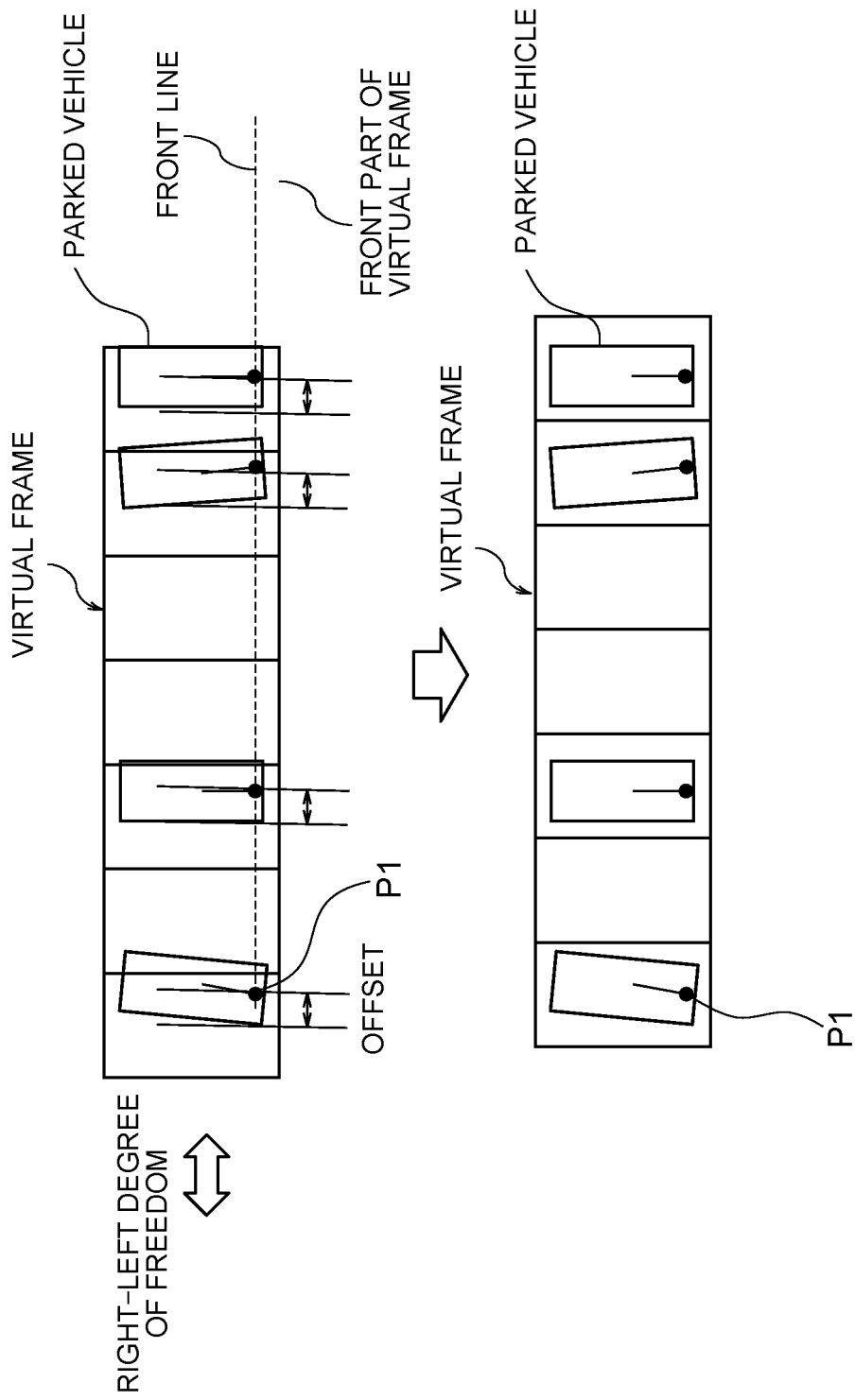
FIG. 7 is a diagram for describing an example of a method of dividing an available parking space.

Examples of methods executed by the available parking space dividing unit 507 to divide the available parking space include the following example. FIG. 7 is a diagram for describing a method of dividing the available parking space according to this example. As illustrated in the upper part of the figure, the available parking space dividing unit 507 first uses the width of the parking frames calculated by the parking frame width calculation unit 504 and the front line to create a ladder-shaped virtual frame in which a series of parking frames is virtualized. The straight line representing the front part of the virtual frame is offset slightly toward the near side with respect to the front line. The offset amount as used herein may be set such that all the parked vehicles included in the parked vehicle group fall inside the virtual frame or may also be a value that is preliminarily set. The length (depth) of each parking frame of the virtual frame may have a value that is preliminarily set in accordance with the length of a commonly-used parking frame.

Subsequently, the available parking space dividing unit 507 sets the position of the virtual frame in the right-left direction (direction in which the parking frames are arranged). First, as illustrated in the upper part of FIG. 7, the position of the representative point P1 of a parked vehicle is projected onto the front part of the virtual frame, and the offset amount between the position of the projected representative point P1 and the center of the front of the parking frame closest to that position is calculated. This process of calculating the offset amount is executed for all the parked vehicles, and the average value of the calculated offset amounts is calculated. Then, the virtual frame is moved in the right-left direction by the calculated average value of the offset amounts thereby to set an optimum position of the virtual frame as illustrated in the lower part of FIG. 7.

Subsequently, the available parking space dividing unit 507 compares the available parking space, which is input from the available parking space calculation unit 505, with the virtual frame and outputs the information on the available parking space to be divided in the virtual frame to the parking target position calculation unit 508.

Referring again to FIG. 2, when the division information of the available parking space (i.e. information on the divided available parking spaces) is input from the available parking space dividing unit 507, the parking target position calculation unit 508 selects one of the divided available parking spaces and calculates the parking target position in the selected available parking space. Examples of the method of selecting one of the available parking spaces include a method of selecting the available parking space closest to the subject vehicle. Examples of the method of calculating the parking target position include a method of setting it to the center back side of the selected available parking space.

The parking route calculation unit 509 calculates a parking route to the target parking position which is input from the parking target position calculation unit 508. The method of calculating the parking route is not particularly limited, and various known methods can be used.

The search route calculation unit 510 calculates a travel route for searching for an available parking space when parking was not possible. The available parking space is searched using the information on the front line which is input from the parking frame width calculation unit 504. For example, a basic travel line is created by offsetting the front line to the travel route side of the vehicle, and a route for traveling along the basic travel line from the current position of the subject vehicle is calculated. In this case, the subject vehicle travels along a series of parking frames.

On the basis of the information input from the parking availability determination unit 506 as to whether or not parking of the subject vehicle into the available parking space is possible, the vehicle control command value calculation unit 511 calculates a vehicle control command value for traveling along the parking route input from the parking route calculation unit 509 when parking is possible, and calculates a vehicle control command value for traveling along the search route, which is input from the search route calculation unit 510, when parking is not possible. Then, the vehicle control command value calculation unit 511 outputs the calculated vehicle control command value to the vehicle control ECU 60. Examples of the vehicle control command value include the target vehicle speed and the target steering angle, for example, but other command values such as the acceleration of the subject vehicle may be included therein. The method of calculating the vehicle control command value is not particularly limited, and various known methods can be used.

Figure 8:
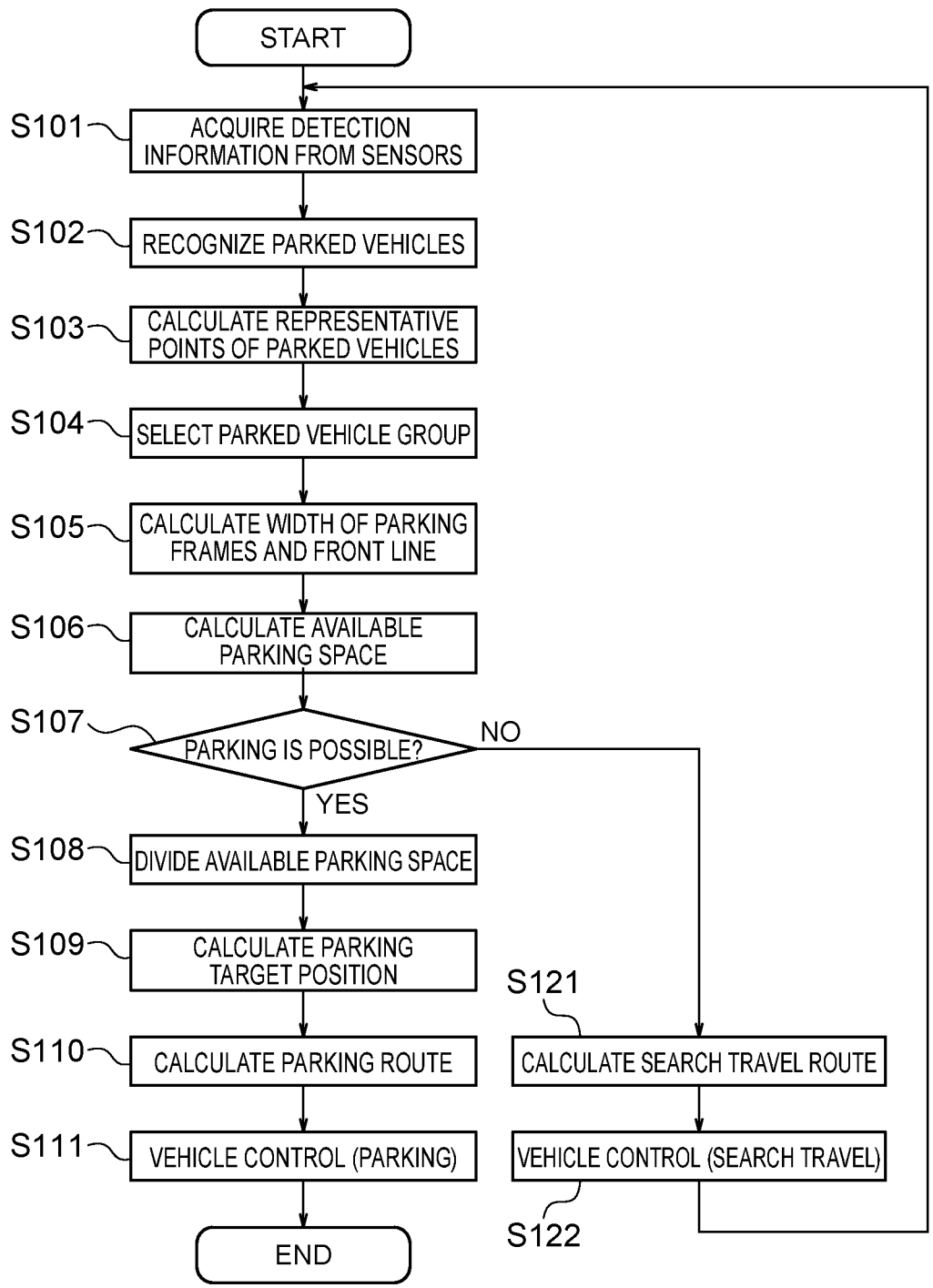
FIG. 8 is a flowchart illustrating the control procedure of a parking assist process executed by the parking assist device according to one or more embodiments of the present invention.

FIG. 8 is a flowchart illustrating the control procedure of a parking assist process executed by the parking assist device 100 according to one or more embodiments of the present invention. When an ON signal is input from the main switch 40 to the parking assist ECU 50, the parking assist process is started, which is followed by step S101.

In step S101, detection information is input from the set of ranging sensors 10, the travel distance sensor 20, and the steering angle sensor 30 to the parking assist ECU 50. Then, in step S102, the parked vehicle recognition unit 501 recognizes the parked vehicles on the basis of the information on the point clouds which is input as clouds of polar coordinates from the set of ranging sensors 10.

Then, in step S103, the vehicle representative point calculation unit 502 calculates the representative point P1 of each parked vehicle on the basis of the information on the point clouds which is input from the parked vehicle recognition unit 501. Then, in step S104, the vehicle group selection unit 503 selects a parked vehicle group existing in a series of parking frames of which the directions and the like are the same, on the basis of the information on the position of the representative point P1 and direction of each parked vehicle, which information is input from the vehicle representative point calculation unit 502.

Then, in step S105, the parking frame width calculation unit 504 calculates the width of the parking frames and the front line on the basis of the information on the positions and directions of the parked vehicles which are grouped into the same parked vehicle group, which information is input from the vehicle group selection unit 503. Then, in step S106, the available parking space calculation unit 505 calculates the available parking space on the basis of the information on the point clouds which is input from the set of ranging sensors 10.

Then, in step S107, the parking availability determination unit 506 determines whether or not parking of the subject vehicle into the available parking space is possible, on the basis of the information on the width of the parking frames input from the parking frame width calculation unit 504, the information on the available parking space input from the available parking space calculation unit 505, and the information on the vehicle width v_width of the subject vehicle. In step S107, when a determination is made that parking of the subject vehicle is possible, the routine proceeds to step S108 while when a determination is made that parking of the subject vehicle is not possible, the routine proceeds to step S121.

In step S121, the search route calculation unit 510 calculates the travel route for searching for an available parking space using the information on the front line which is input from the parking frame width calculation unit 504. Then, in step S122, the vehicle control command value calculation unit 511 calculates the vehicle control command value for traveling along the travel route for search which is input from the search route calculation unit 510, and the vehicle control ECU 60 executes the drive control for the vehicle in accordance with the vehicle control command value which is input from the vehicle control command value calculation unit 511.

On the other hand, in step S108, the available parking space dividing unit 507 divides the available parking space by the number Pnum of the parking frames on the basis of the information on the width of the parking frames input from the parking frame width calculation unit 504 and the information on the available parking space input from the available parking space calculation unit 505. Then, in step S109, the parking target position calculation unit 508 selects one of the divided available parking spaces and calculates the parking target position in the selected available parking space.

Then, in step S110, the parking route calculation unit 509 calculates the parking route to the target parking position which is input from the parking target position calculation unit 508. Then, in step S111, the vehicle control command value calculation unit 511 calculates the vehicle control command value for traveling along the parking route which is input from the parking route calculation unit 509, and the vehicle control ECU 60 executes the drive control for the vehicle in accordance with the vehicle control command value which is input from the vehicle control command value calculation unit 511. Thus, the parking assist process is completed.

In the above-described control procedure of the parking assist process, after the parking target position is calculated, the parking operation is executed to complete the parking assist process, but the present invention is not limited to this, and the routine may return from step S111 to step S102 to sequentially correct (offset) the parking target position.

As described above, in the parking assist method and parking assist device 100 according to one or more embodiments of the present invention, the process includes acquiring, from the set of ranging sensors 10, recognition information about a plurality of parked vehicles existing in a parking frame group comprising a plurality of parking frames arranged side by side, selecting representative points P1 of the parked vehicles from the recognition information, calculating a distance D between representative points that is a distance between the representative points P1 adjacent to each other, and calculating a width of the parking frames on the basis of the distance D between representative points. Through this operation, as compared with a case of setting a plurality of parking frames using a width of parking frames that is preliminarily set, the errors between the width of parking frames which is to be set and the actual widths of the parking frames can be reduced, and the parking frames can therefore be appropriately set.

In the parking assist method and parking assist device 100 according to one or more embodiments of the present invention, the recognition information about three or more parked vehicles existing in the parking frame group comprising three or more parking frames is acquired from the set of ranging sensors 10, the representative points P1 of the three or more parked vehicles are selected from the recognition information, and the width of the parking frames is calculated on the basis of the information on a plurality of the distances D between representative points. This allows the width of the parking frames to be calculated on the basis of the information on a larger number of the distances D between representative points, and the width of the parking frames can thus be calculated more accurately.

In the parking assist method and parking assist device 100 according to one or more embodiments of the present invention, the process includes setting an assumed value dx as the unit distance d between representative points which is approximately identical with the width of the parking frames and calculating an error de from an integral multiple of the assumed value dx for each of the plurality of distances D between representative points calculated from the recognition information about the three or more parked vehicles. Here, the error de is calculated each time the assumed value dx is varied. Then, the assumed value dx which gives a minimum sum de_sum of the errors is calculated as the width of the parking frames. This allows the width of the parking frames to be appropriately calculated.

In the parking assist method and parking assist device 100 according to one or more embodiments of the present invention, the process includes calculating directions of the parked vehicles from the recognition information which is input from the set of ranging sensors 10 and calculating the direction (inclined angle α with respect to the front line) of the parking frames on the basis of the calculated directions of the parked vehicles and the positions of the representative points P1. This allows the direction of the parking frames to be appropriately set even in a parking lot of the angle parking scheme.

In addition or alternatively, when the width direction of the parking frames is inclined with respect to the direction in which the parking frames are arranged (extending direction of the front line), the width of the parking frames is calculated on the basis of the inclined angle α (width=d×sin α). This allows the width of the parking frames to be appropriately calculated even in a parking lot of the angle parking scheme.

In the parking assist method and parking assist device 100 according to one or more embodiments of the present invention, the process includes detecting an empty space (available parking space) existing in the parking frame group from the recognition information and determining whether or not parking of the subject vehicle into the available parking space is possible on the basis of the calculated width of the parking frames and the vehicle width v_width of the subject vehicle. The parking frame group comprises a plurality of parking frames arranged side by side. The recognition information is input from the set of ranging sensors 10. Through this operation, when parking is physically possible but it is preferred not to park, a determination can be made that parking is not possible. For example, when the right and left parked vehicles are located on the opposite sides with respect to a parking frame dedicated for a sub-compact vehicle (small engine displacement vehicle), even if an ordinary car can be physically parked into the parking frame dedicated for a sub-compact vehicle (small engine displacement vehicle), a determination can be made that parking is not possible.

In addition or alternatively, the above available parking space can be divided into a plurality of parking spaces in accordance with the calculated width of the parking frames thereby to set the width and number of empty parking frames so as to match the actual situation of the parking frame group.

Figure 9:
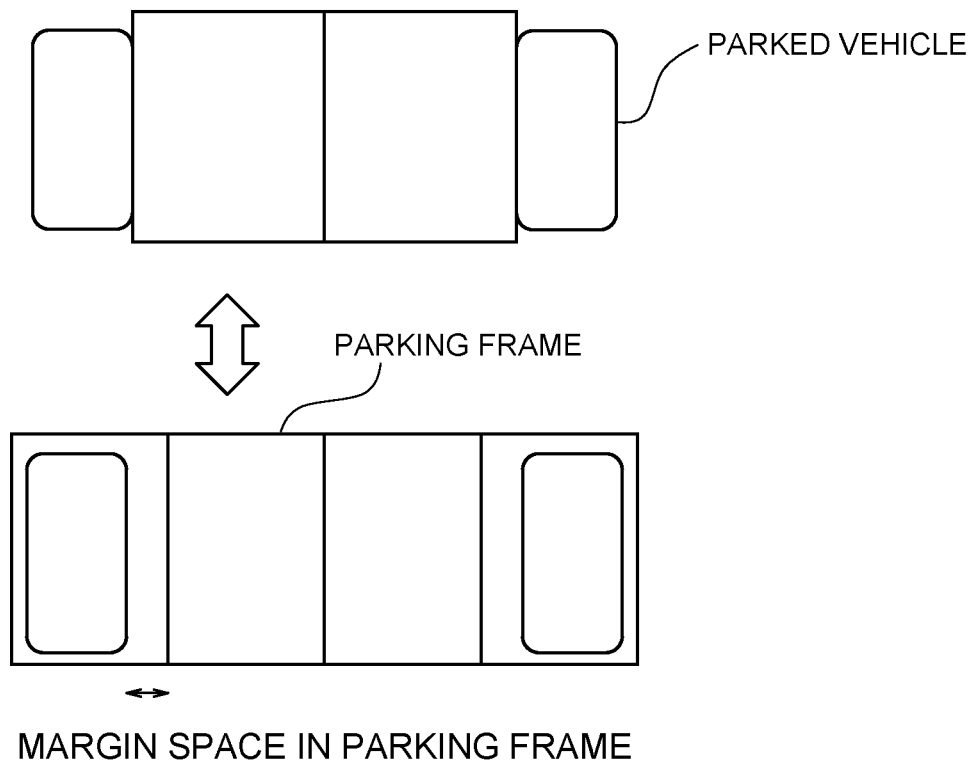
FIG. 9 is a diagram for describing a method of dividing an available parking space.

In addition or alternatively, the process includes calculating a virtual frame composed of a plurality of virtual parking frames having the calculated width of the parking frames, overlapping the virtual frame, the available parking space, and the recognized parked vehicles so that each of the parked vehicles falls within any of the virtual parking frames, and dividing the available parking space into a plurality of parking spaces partitioned with the virtual parking frames. Here, by minimizing an error between the center in the vehicle width direction of a parked vehicle and the center in the width direction of a parking frame, it is possible to appropriately set the parking frame, as illustrated in FIG. 9, with consideration for a margin space for enabling a parson to get on and out, etc.

In the parking assist method and parking assist device 100 according to one or more embodiments of the present invention, the process includes setting one of the parking frames obtained by dividing the available parking space as a parking target position, calculating a parking route to the parking target position, and controlling the subject vehicle so as to travel along the parking route. This allows the automated parking to be executed without the operation performed by the driver.

In addition or alternatively, the process includes calculating a search route for search travel in a parking lot on the basis of the positions of the representative points P1 and controlling the subject vehicle so as to travel along the above search route when a determination is made that parking of the subject vehicle is not possible into the available parking space. This enables the automated execution of the travel from the search travel for detecting the available parking space to the target parking position without the operation performed by the driver.

In the above-described embodiments, the "parking assist device 100" corresponds to an example of the "parking assist device" in the present invention, the "parked vehicle recognition unit 501" corresponds to an example of the "recognition information acquirer" in the present invention, the "vehicle representative point calculation unit 502" corresponds to an example of the "representative point selector" and "distance calculator configured to calculate a distance between representative points" in the present invention, and the "parking frame width calculation unit 504" corresponds to an example of the "parking frame width calculator" in the present invention.

In the above-described embodiments, the "representative point P1" corresponds to an example of the "representative points" in the present invention, the "distance D between representative points" corresponds to an example of the "distance between representative points" in the present invention, the "assumed value dx" corresponds to an example of the "assumed value" in the present invention, the "error de" corresponds to an example of the "error" in the present invention, and the sum de_sum of errors" corresponds to an example of the "sum of the errors" in the present invention.

Embodiments heretofore explained are described to facilitate understanding of the present invention and are not described to limit the present invention. It is therefore intended that the elements disclosed in the above embodiments include all design changes and equivalents to fall within the technical scope of the present invention.

For example, the above-described embodiments have been described on the assumption that one or more cameras are equipped in the subject vehicle, but the present invention is not limited to this, and one or more embodiments of the present invention may be carried out on the assumption that a fixed camera provided at a parking lot, a camera of another vehicle, and/or a portable camera of the user are used. In such cases, the information on the parking spaces may be acquired from external to perceive the parking state in the parking spaces.

DESCRIPTION OF REFERENCE NUMERALS

100 Parking assist device
501 Parked vehicle recognition unit
502 Vehicle representative point calculation unit
503 Vehicle group selection unit
504 Parking frame width calculation unit

The invention claimed is:
1. A parking assist method comprising:
acquiring recognition information about three or more parked vehicles existing in a parking frame group comprising three or more parking frames arranged side by side;
selecting representative points set at same positions of the three or more parked vehicles from the recognition information;
calculating a distance between representative points that is a distance between the representative points adjacent to each other;
setting an assumed value as the width of the parking frames and calculating errors between a plurality of the distances between representative points and a value of an integral multiple of the assumed value; and
calculating the assumed value which gives a minimum sum of the errors as the width of the parking frames.
2. The parking assist method according to claim 1, comprising:
calculating directions of the parked vehicles from the recognition information; and calculating a direction of the parking frames on a basis of the calculated directions of the parked vehicles and positions of the representative points.

3. The parking assist method according to claim 2, comprising:
calculating the width of the parking frames on a basis of the calculated direction of the parking frames.

4. The parking assist method according to claim 1, comprising:
detecting an empty parking space existing in the parking frame group from the recognition information; and
determining whether or not parking of a subject vehicle into the empty parking space is possible on a basis of the calculated width of the parking frames and a vehicle width of the subject vehicle.

5. The parking assist method according to claim 4, comprising:
dividing the empty parking space into a plurality of parking spaces in accordance with the calculated width of the parking frames.

6. The parking assist method according to claim 5, comprising:
calculating a virtual frame composed of a plurality of virtual parking frames having the calculated width of the parking frames; and
overlapping the virtual frame, the empty parking space, and the parked vehicles recognized so that each of the parked vehicles falls within any of the virtual parking frames and dividing the empty parking space into the plurality of parking spaces partitioned with the virtual parking frames.

7. The parking assist method according to claim 1, comprising
setting one of a plurality of the parking spaces as a parking target position;
calculating a parking route to the parking target position; and
controlling the subject vehicle so as to travel along the parking route.

8. The parking assist method according to claim 7, comprising
calculating a search route for search travel in a parking lot on a basis of positions of the representative points; and
controlling the subject vehicle so as to travel along the search route when a determination is made that parking of the subject vehicle into the empty parking space is not possible.

9. A parking assist device comprising:
recognition information sensors configured to acquire recognition information about three or more parked vehicles existing in a parking frame group comprising three or more parking frames arranged side by side; and
a controller configured to:
select representative points set at same positions of the three or more parked vehicles from the recognition information;
calculate a distance between representative points that is a distance between the representative points adjacent to each other; and
calculate a width of the parking frames on a basis of a plurality of the distances between representative points;
set an assumed value as the width of the parking frames and calculate errors between the distances between representative points and a value of an integral multiple of the assumed value; and
calculate the assumed value which gives a minimum sum of the errors as the width of the parking frames.

* * * * *